United States Patent [19]
Kask

[11] 3,828,968
[45] Aug. 13, 1974

[54] CLOSURE PLUG
[75] Inventor: Eugene Kask, Willimantic, Conn.
[73] Assignee: Rogers Corporation, Rogers, Conn.
[22] Filed: Mar. 31, 1972
[21] Appl. No.: 240,133

[52] U.S. Cl. ................................ 220/24.5, 138/89
[51] Int. Cl. ...................... B65d 39/12, F611 55/12
[58] Field of Search............ 220/24.5, 24 A, DIG. 9; 138/89; 217/109, 78

[56] References Cited
UNITED STATES PATENTS

| | | | |
|---|---|---|---|
| 280,931 | 7/1883 | Jackson | 217/109 |
| 2,690,946 | 10/1954 | Roehrl | 220/24.5 |
| 3,369,653 | 2/1968 | Edwards | 220/24.5 |
| 3,451,583 | 6/1969 | Lee | 220/24.5 |
| 3,498,447 | 3/1970 | Edwards | 220/24.5 |

Primary Examiner—George E. Lowrance

[57] ABSTRACT

A closure plug is presented having a flexible hollow cup and a rigid insert adapted to form an interference fit with the interior of the cup whereby the cup is expanded into locking engagement with an opening to be sealed. The rigid insert physically displaces a contoured segment on the interior of the cup whereby the outer surface is brought into locking engagement with the opening to be sealed. A shoulder on the flexible cup retains the rigid insert in place, the shoulder being displaceable to allow removal of the rigid insert.

7 Claims, 2 Drawing Figures

PATENTED AUG 13 1974  3,828,968
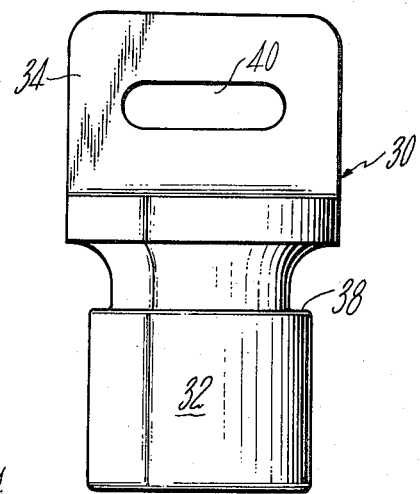
FIG. 1
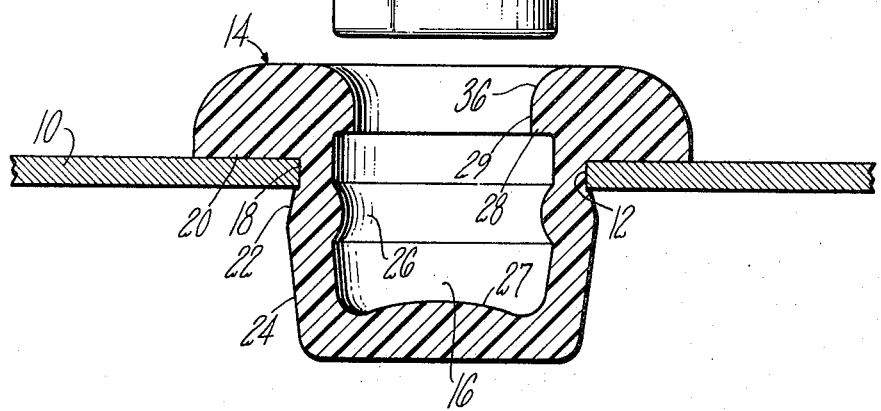
FIG. 2
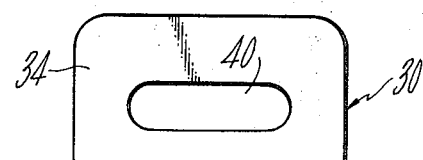
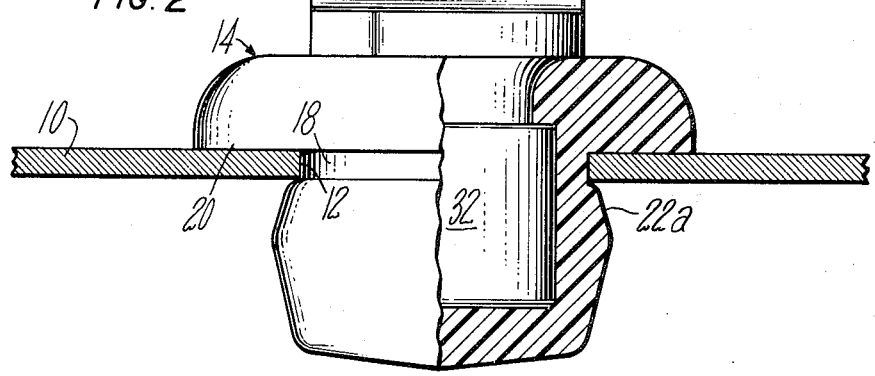

CLOSURE PLUG

BACKGROUND OF THE INVENTION:

1. Field of the Invention

This invention relates to the field of closing or sealing plugs. More particularly, this invention relates to the field of expandable closure or sealing plugs wherein a flexible cup shaped plug element is expanded into sealing engagement with an aperture by means of a rigid element inserted into the interior of a cup.

2. Description of the Prior Art

Various devices embodying a cup shaped expandable element and expander insert have been known in the art for many years. Examples of such devices may be found in U.S. Pat. Nos. 850,844, 3,451,583 and 1,120,369. A structurally similar device may be seen in U.S. Pat. No. 2,212,423. Some of these devices have typically been intended for use as inserts for support or fastening devices and/or have been intended for permanent installations. Such devices have typically lacked features which make them suitable for repeated use, expecially in pressurized environments, wherein the plug can be inserted, removed and reinserted when desired and with confidence in the repeatability of its functioning. Some of these devices, such as shown in U.S. Pat. No. 850,844 are intended for repeated use, but they are typically only suitable for use in such applications as bottle stoppers.

SUMMARY OF THE INVENTION:

The present invention relates to a closure plug which is versatile, reliable, and low cost and which is particularly adaptable and suitable for use in industrial, chemical, machinery or mechanical environments wherein repeatability of operation and high reliability are of critical importance. The closure plug of the present invention is particularly suitable for use in closing openings in the walls of containers of various fluids, such as automobile differential covers, grease or lubrication pans for machinery, and similar and other containers, whether pressurized or not, where orifices must be maintained under positive seal but have easy access with respect thereto for examining the fluid in the container or for adding to or emptying the fluid from the container. The closure plug is also particularly suitable and adaptable for use with chemical storage vessels and a wide range of chemicals environments through the wide choice of materials available for use in forming the plug.

The present invention is particularly adaptable for use as replacement for screw type plugs, either of the type where threads are tapped in the wall opening of a vessel or where a threaded nut is attached to the wall opening to receive a threaded screw plug. The threaded plug and mating female members of either configuration are relatively expensive and time consuming to generate, and present definite problems of leakage caused by contamination or crossing of the threads; and they often present corrosion problems in chemical environments, thus often requiring the use of expansive materials.

The present invention eliminates many of the problems of the prior art by providing a reliable, versatile, low cost reusable plug assembly which effects a positive sealing of the opening and which can be easily and repeatedly inserted and removed. The closure plug of the present invention has a resilient cup shaped element which fits into the opening to be sealed in the wall of a particular vessel. The resilient cup has an external shoulder for enaging the outer wall of the vessel, an internal shoulder which serves to retain an insert in place, and an internal annular ring which is physically displaceable by the insert to cause sealing between the flexible cup and the inner wall of the vessel. A rigid insert retains the flexible cup in sealing engagement with the opening in the wall of the vessel, and the rigid insert is itself held in place by an internal shoulder on the cup, which shoulder is displaceable to allow both entry and removal of the insert.

The closure plug of the present invention can be easily inserted into and removed from the opening which it is intended to seal with nothing more than direct lineal force. However, the closure plug provides a positive seal, eliminates problems of thread crossing ad minimizes any problems of leakage resulting from contamination in the vessel opening. Also, corrosion problems of chemical environments can be overcome by proper choice of material for use in forming the resilient cup.

Accordingly, one object of the present invention is to provide a novel and improved closure plug.

Another object of the present invention is to provide a novel and improved closure plug having a flexible cup and a rigid insert.

Still another object of the present invention is to provide a novel and improved closure plug which is particularly suited for usein indistrial, chemical, machinery and mechanical environments.

Still another object of the present invention is to provide a novel and improved closure plug which eliminates or minimizes leakage problems resulting from the crossing of threads and dirt in the opening to be sealed.

Still another object of the present invention is to provide a novel and improved closure plug which is reliable, versatile, reuseable and of low cost.

Other objects and advantages will be apparent and understood to those skilled in the art from the following detailed description and drawings.

BRIEF DESCRIPTION OF THE DRAWING:

In the drawings, wherein like elements are numbered alike in the several figures:

FIG. 1 is a sectional elevation view of the closure plug of the present invention in a relaxed state of partial assembly.

FIG. 2 is a sectional elevation view of the closure plug of FIG. 1 in a fully assembled state.

DESCRIPTION OF THE PREFERRED EMBODIMENT:

Referring now to FIG. 1, a partial segment of the wall 10 of a vessel is shown having an annular orifice or opening 12. A cup shaped element 14, which forms part of the closure plug, is shown seated in orifice 12 in a relaxed state. Cup element 14 is formed of soft molded rubber or plastic material of about 70 durometer harndess, and it is of an annular configuration and has a hollow central portion or chamber 16. Cup 14 is sized for the particular orifice 12 with which it is intended to be used so that the outside diameter of neck portion 18 fits snugly with the wall of orifice 12 to provide a preliminary sealing and retention effect. An external shoulder 20 engages the outer surface of wall to further enhance this preliminary sealing effect, and the exterior surface 22 immediately below neck 18 flares outward to also enhance the preliminary sealing and retention effects. Outer surface 24 below surface portion 22 may, as shown, be inclined inwardly to enhance entry and guidance of the resilient cup through orifice 12 by narrowing down at its base to an external diameter slightly less than or equal to the diameter of orifice 12. Surface 22 flares outwardly to a diameter slightly greater than the diameter of orifice 12, but it will be apparent that it is displaced inwardly during insertion and then returns to the relaxed state shown in FIG. 1 after insertion through orifice 12.

Still referring to FIG. 1, an annular ring 26 extends around the interior of cup 14 and projects into chamber 16 in the relaxed state of the cup element. Similarly, the base of cup 14 has a convex protrusion 27 extending into chamber 16 in the relaxed state. Ring 26 is positioned substantially directly opposite to outwardly flared surface 22 and is approximately coextensive with the length of flared surface 22. Cup 14 also has an internal shoulder 28 which is located above shoulder 20 and extends inwardly toward the axis of chamber 16 for a discrete distance beyond the inner diameter of neck 18. Both ring 26 and shoulder 28 dynamically react with a rigid insert element for sealing and retention of resilient cup 14. The head 29 of cup 14 has a contoured opening leading into chamber 16.

Referring now to FIG. 2, the closure plug of the present invention is shown in its expanded state wherein sealing and retention are effected. To achieve the condition shown in FIG. 2, a rigid insert 30, having a head portion 32 and a handle portion 34, is inserted into the interior of cup 14. Head portion 32 is a cylindrical block having an outer diameter slightly larger than the relaxed inner diameter of neck 18 and, thusly, being larger than the smallest inner diameter of cup head 29. Insert 30 is a rigid element, being made of metal, hard plastic, wood or some other rigid substance. To assemble the closure plug in the configuration shown in FIG. 2, head 32 is positioned at the inner opening of head 29 of cup 14, and lineal force along the axis of chamber 16 is exerted. Because of the flexibility of the material of cup 14, head 29 and shoulder 28 are expanded or driven outwardly so that insert head 32 enters into and fully occupies chamber 16. Thus, it will be observed that the relative location of shoulder 28 above shoulder 20, and thus above the outer surface of wall 10, is important so that the above stated expansion can occur to allow entry of head 32 into chamber 16.

When head 32 enters and occupies chamber 16, ring 26 is physically displaced outwardly, and this distortion is transmitted through the wall of the cup to flared surface 22 whereby flared surface 22 is expanded outwardly as shown at 22(a) so that the upper part thereof firmly engages and seals with the inner surface of wall 10. Similarly, protrusion 27 is driven into the material of the base cup 14 to take the base shape shown in FIG. 2. Upon full insertion of head 32 into chamber 16, contoured head 29 contacts to meet with a corresponding contoured section on plug 30 and shoulder 28 overlaps and engages with a corresponding shoulder 38 on head 32. This engagement between shoulder 28 and shoulder 38 serves to firmly and positively retain insert 30 in place and thus locks the cup 14 firmly into orifice 12 in full sealing engagement. As noted above, the external diameter of head 32 is slightly larger than the inner diameter of neck 18 in the relaxed state of cup 14, so that when assembled as shown in FIG. 2 neck 18 is driven into tight sealing engagement with the orifice 12 along the entire thickness of wall 10. The sealing engagement between expanded surface 22(a) and the inner surface of wall 10 along with the sealing engagement between neck 18 and the full thickness or orofice 12 provides a full and positive liquid seal for any fluid within the vessel defined by wall 10. Furthermore this seal is particularly effective against leaks which might result from dirt or other contamination along the sealing surfaces since the resiliency of the material of cup 14 allows the cup to surround any such contamination and reseal with the wall surfaces to minimize any leakage path.

Handle 34 of insert 30 serves as a gripping element for inserting and removing the insert. The insert may be grasped at handle 34 to position it in place as shown in FIG. 2. Similarly, when it is desired to disassemble the closure plug in order to achieve access to the interior of the fluid vessel, handle 34 is grasped and force is exerted outwardly along the axis of chamber 16. Shoulder 38 is thus caused to ride over and outwardly displace shoulder 28 and contoured head 29 whereby head 32 is withdrawn from chamber 16, thus returning flexible cup 14 to its relaxed state wherein it can be simply manually compressed and removed from the wall. An opening 40 is formed in handle 34 to accomodate the insertion of a special tool for both insertion and removal of the closure plug in those situations in which the location does not allow direct manual access. Also, if desired, opening 40 can be used to accomodate a screwdriver or other lever instrument which may be used with an accompanying support for mechanical advantage in withdrawing insert 30.

While a preferred embodiment has been shown and described various modifications and substitutions may be made thereto without departing from the spirit and scope of the invention. Accordingly, it is to be understood that the present invention has been described by way of illustration and not limitation.

What is claimed is:

1. A closure plug for closing an orifice in a wall, said plug including:

a resilient cup element having an elongated body portion adapted for insertion into the orifice, said cup element having a hollow interior chamber in said body portion, an open head at one end of said cup element leading to said interior chamber, and a closed base at the other end of said cup element, said interior chamber and said closed base being positioned interiorly of the wall and said open head end being positioned exteriorly of the wall when said cup element is inserted into the orifice;

an exterior shoulder on said cup for engaging the exterior surface of the wall;

an interior shoulder on said cup spaced from said exterior shoulder toward said open head end of said cup and extending toward the center of said interior chamber;

a protruding element on the inner wall of said cup extending into said interior chamber in a relaxed state of said cup, said protruding element being spaced from said exterior shoulder toward said closed base of said cup element and beginning at a distance spaced from said exterior shoulder by an amount approximately equal to the thickness of the wall, said interior shoulder and said protruding element being spaced apart on opposite sides of said exterior shoulder; and an expander insert for insertion into said cup, said insert including:

a head portion for occupying said interior chamber of said cup and displacing said protruding element outwardly to seal a surface of said cup against the inner surface of the wall; and a shoulder on said insert positioned for locking engagement with said interior shoulder on said cup when said insert is fully inserted into said cup.

2. A closure plug as in claim 1 wherein:
said protruding element is an annular ring extending around the inner surface of said cup element.

3. A closure plug as in claim 1 including:
an outwardly flaring outer surface on said cup spaced from said exterior shoulder on the side thereof toward said base of said cup, said outwardly flaring surface beginning at a location spaced from said exterior shoulder by an amount approximately equal to the thickness of the wall, and said outwardly flaring surface and said annular ring being approximately coextensive, said ring being displaceable outwardly to drive said flaring surface toward sealing engagement with the inner surface of the wall.

4. A closure plug as in claim 1 wherein:
said insert has a handle portion extending away from said head portion.

5. A closure plug as in claim 4 wherein:
said head portion is cylindrical and of slightly larger exterior size than said hollow interior chamber.

6. A closure plug as in claim 4 wherein:
said cup element has a neck portion engaging said orifice and held in sealing engagement therewith by said insert.

7. A closure plug as in claim 4 wherein:
said open head of said cup element is contoured and said insert has a segment of mating contour therewith.

* * * * *